United States Patent
Wright

(10) Patent No.: US 8,703,860 B2
(45) Date of Patent: Apr. 22, 2014

(54) PARAMETHYLSTYRENE BLOCK COPOLYMERS AND THEIR USE

(71) Applicant: Kraton Polymers U.S. LLC, Houston, TX (US)

(72) Inventor: Kathryn Wright, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 3 days.

(21) Appl. No.: 13/622,575

(22) Filed: Sep. 19, 2012

(65) Prior Publication Data

US 2014/0080963 A1    Mar. 20, 2014

(51) Int. Cl.
*C08L 53/00*    (2006.01)

(52) U.S. Cl.
USPC ............................................. 524/505; 525/89

(58) Field of Classification Search
CPC ................................. C08L 53/00; C08L 23/10
USPC ....................................................... 524/505
See application file for complete search history.

(56) References Cited

U.S. PATENT DOCUMENTS

| | | | |
|---|---|---|---|
| RE27,145 E | 6/1971 | Jones | |
| 3,686,366 A | 8/1972 | Winkler | |
| 3,700,748 A | 10/1972 | Winkler | |
| 4,391,949 A | 7/1983 | St. Clair | |
| 4,444,953 A | 4/1984 | St. Clair | |
| 5,194,535 A | 3/1993 | Koppes et al. | |
| 6,492,469 B2 | 12/2002 | Willis et al. | |
| 6,803,014 B2 | 10/2004 | Ho et al. | |
| 7,105,600 B2 | 9/2006 | Kitano et al. | |
| 7,432,037 B2 | 10/2008 | Suzuki et al. | |
| 8,048,362 B2 | 11/2011 | Suzuki et al. | |
| 2004/0132907 A1 | 7/2004 | Nakamura et al. | |
| 2007/0066753 A1 * | 3/2007 | Ehrlich et al. | 525/89 |
| 2011/0262686 A1 * | 10/2011 | Wright et al. | 428/114 |

FOREIGN PATENT DOCUMENTS

| | | |
|---|---|---|
| CA | 716645 A | 8/1965 |
| CA | 2444534 C | 1/2011 |
| EP | 1398349 B1 | 5/2008 |
| JP | 20040138168 A | 5/2004 |
| WO | 02090433 A1 | 11/2002 |

* cited by examiner

*Primary Examiner* — Hui Chin
(74) *Attorney, Agent, or Firm* — Clements/Bernard; Michael A. Masse

(57) ABSTRACT

The present invention comprises an uncrosslinked composition of a styrenic block copolymer and PMS-I/B-PMS (paramethylstyrene-isoprene/butadiene-paramethylestyrene) block copolymer, optionally with one or more antioxidants and a carbon radical scavenger. The mid-block IB is a random mixture of isoprene and butadiene. Further, a process is disclosed for making the uncrosslinked composition. The present invention also includes an uncrosslinked composition of homo polystyrene, and PMS-I/B-PMS block copolymer, optionally with one or more antioxidants and a carbon radical scavenger. The present invention also comprises a crosslinked polyolefin-free composition of PMS-I/B-PMS block copolymer, optionally with a styrenic block copolymer and one or more antioxidants, a carbon radical scavenger, and free radical initiator. The present invention also includes an article incorporating an uncrosslinked composition of a styrenic block copolymer and homo polystyrene, and PMS-I/B-PMS block copolymer, optionally with one or more antioxidants and a carbon radical scavenger.

15 Claims, No Drawings

US 8,703,860 B2

PARAMETHYLSTYRENE BLOCK COPOLYMERS AND THEIR USE

FIELD OF THE INVENTION

The present invention relates to uncrosslinked elastomeric compositions having paramethylstyrene (PMS), a process for making the same, uncrosslinked elastomeric compositions containing paramethylstyrene block copolymer suitable for elastic film or fiber, crosslinked polyolefin-free elastomeric compositions containing paramethylstyrene block copolymer, and molded articles made from crosslinked or uncrosslinked paramethylstyrene compositions. More specifically the present invention concerns a composition of styrenic block copolymer, paramethylstyrene block copolymer, and optionally antioxidants.

PRIOR ART

Paramethylstyrene block copolymer compositions are well known for crosslinking articles, specifically when polyolefin is a component of the crosslinked composition.

U.S. Pat. No. 8,048,362 assigned to Kuraray Co. Ltd. discloses a polyolefin resin that contains PMS end blocks and a mixture of butadiene/isoprene mid-block. The resin is crosslinked using electron beam. The claimed molded article calls for high density polyethylene, low density polyethylene, and/or ethylene-α-olefin.

Canadian Pat. No. 2,444,534 assigned to Kuraray Co. Ltd. discloses a crosslinked polyolefin resin containing SBC and PMS, and polyolefin in the form of ethylene polymers, propylene polymers, polybutene-1 and/or poly(4-methylpentene-1). Crosslinking is accomplished by electron beam radiation.

These patents are directed to crosslinked resins. PMS-I/B-PMS block copolymer is employed for crosslinking applications with a polyolefin resin, however no disclosure exists for non-crosslinking applications such as elastic film or fiber, nor for crosslinked compositions of PMS-I/B-PMS combined with non-olefin resins, or crosslinked PMS-I/B-PMS alone. The present invention covers these areas of technology.

SUMMARY OF THE INVENTION

In the broadest sense, the present invention comprises an uncrosslinked composition of a styrenic block copolymer, PMS-I/B-PMS (paramethylstyrene-isoprene/butadiene-paramethylestyrene) block copolymer, optionally with one or more antioxidants and a carbon radical scavenger. The mid-block I/B is a random mixture of isoprene and butadiene. Further, a process is disclosed for making the uncrosslinked composition.

In the broadest sense the present invention also includes an uncrosslinked composition of homo polystyrene, PMS-I/B-PMS block copolymer, optionally with one or more antioxidants and a carbon radical scavenger. The mid-block I/B is a random mixture of isoprene and butadiene.

In the broadest sense, the present invention also comprises a crosslinked polyolefin-free composition of PMS-I/B-PMS block copolymer, optionally with a styrenic block copolymer, homopolystyrene and one or more antioxidants, a carbon radical scavenger, and free radical initiator. The mid-block I/B is a random mixture of isoprene and butadiene. Further this composition may be incorporated into molded articles such as elastic film or fiber.

Lastly, in the broadest sense, the present invention also includes an article incorporating an uncrosslinked composition of a styrenic block copolymer and homo polystyrene, and PMS-I/B-PMS block copolymer, optionally with one or more antioxidants and a carbon radical scavenger. The mid-block I/B is a random mixture of isoprene and butadiene.

The styrenic block copolymer in each of the above contains at least 2 end blocks of monoalkenylarene and at least 1 block of butadiene.

DESCRIPTION OF THE PREFERRED EMBODIMENTS

All ranges set forth in the specification and claims include not only the end point of the ranges, but also every conceivable number between the end points of the range, since that is the very definition of a range.

The styrenic block copolymer of the present invention may be unsaturated di-, tri-, quad-blocks of mono alkenyl arenes having 8 to 18 carbon atoms, and conjugated dienes having 4 to 12 carbon atoms. Examples of suitable mono alkenyl arenes are styrene, alpha methyl styrene, propyl styrene, butyl styrene, cyclohexyl styrene, and mixtures of 2 or more. Preferred are paramethyl-styrene and styrene or mixtures thereof. The conjugated dienes for use herein are isoprene, 1,3-butadiene and substituted butadienes such as piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene". These products are made via anionic solvent polymerization techniques, well known to those skilled in the art, as set forth in U.S. Pat. No. Re. 27,145.

The mid-block of the PMS-I/B-PMS block copolymer is generally a random block copolymer. However, it also may be a distribution of a block of predominately butadiene, followed by a block of predominately isoprene, followed by a block of predominantly butadiene, such that the predominately butadiene blocks are always adjacent the PMS end blocks. The mid-block may also be a controlled distribution where the mid-block contains butadiene, isoprene and styrene, whereby all the butadiene blocks are always adjacent the PMS end blocks. Then the isoprene and styrene can be randomly dispersed between the 2 predominately butadiene blocks, in the mid-block.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Other important starting materials for anionic co-polymerizations include one or more polymerization initiators. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain.

The lithium initiator process is well known and is described in, for example, U.S. Pat. Nos. 4,039,593 and Re. 27,145, which descriptions are incorporated herein by reference.

Another important aspect of the present invention is to control the microstructure or vinyl content of the conjugated diene in the B block. The term "vinyl" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C=C moiety pendant to the polymer backbone. The effects of 3,4-addition polymerization of isoprene on the final properties of the block copolymer will be similar to those from 1,2-addition of butadiene. When referring to the use of butadiene as the conjugated diene monomer, it is preferred that about 10 to 80 mol percent of the condensed butadiene units in the polymer block have a 1,2-addition configuration. Preferably, from about 30 to about 80 mol percent of the condensed butadiene units should have 1,2-addition configuration. When referring to the use of isoprene as the conjugated diene, it is preferred that about 5 to 80 mol percent of the condensed isoprene units in the block have 3,4-addition configuration. Polymer microstructure (mode of addition of the conjugated diene) is effectively controlled by addition of an ether, such as diethyl ether, a diether such as 1,2-diethoxypropane, or an amine as a microstructure modifier to the diluent. Suitable ratios of microstructure modifier to lithium polymer chain end are disclosed and taught in U.S. Pat. No. Re. 27,145.

It is well known in the art to modify the polymerization of the conjugated diene block to control the vinyl content. Broadly, this can be done by utilizing an organic polar compound such as an ether, including cyclic ethers, polyethers and thioethers or an amine including secondary and tertiary amines. Both non-chelating and chelating polar compounds can be used.

Among the polar compounds which may be added in accordance with the one aspect of this invention are dimethyl ether, diethyl ether, ethyl methyl ether, ethyl propyl ether, dioxane, dibenzyl ether, diphenyl ether, dimethyl sulfide, diethyl sulfide, tetramethylene oxide(tetrahydrofuran), tripropyl amine, tributyl amine, trimethyl amine, triethyl amine, pyridine and quinoline and mixtures thereof.

In the present invention "chelating ether" means an ether having more than one oxygen as exemplified by the formula R(OR')$_m$(OR")$_o$OR where each R is individually selected from 1 to 8, preferably 2 to 3, carbon atom alkyl radicals; R' and R" are individually selected from 1 to 6, preferably 2 to 3, carbon atom alkylene radicals; and m and o are independently selected integers of 1-3, preferably 1-2. Examples of preferred ethers include diethoxypropane, 1,2-dioxyethane(dioxo) and 1,2-dimethyoxyethane(glyme). Other suitable materials include CH$_3$—OCH$_2$—CH$_2$—OCH$_2$—CH$_2$—OCH$_3$ (diglyme) and CH$_3$—CH$_2$—OCH$_2$—CH$_2$—OCH$_2$—CH$_2$—CH$_2$—CH$_3$. "Chelating amine" means an amine having more than one nitrogen such as N,N,N',N'-tetramethylethylene diamine.

The amount of polar modifier is controlled in order to obtain the desired vinyl content in the conjugated diene block. The polar modifier is used in an amount of at least 0.1 moles per mole of lithium compound, preferably 1-50, more preferably 2-25, moles of promoter per mole of the lithium compound. Alternatively, the concentration can be expressed in parts per million by weight based on the total weight of solvent and monomer. Based on this criteria from 10 parts per million to about 1 weight percent, preferably 100 parts per million to 2000 parts per million are used. This can vary widely, however, since extremely small amounts of some of the preferred modifiers are very effective. At the other extreme, particularly with less effective modifiers, the modifier itself can be the solvent. Again, these techniques are well known in the art, disclosed for instance in Winkler, U.S. Pat. No. 3,686,366 (Aug. 22, 1972), Winkler, U.S. Pat. No. 3,700,748 (Oct. 24, 1972) and Koppes et al., U.S. Pat. No. 5,194,535 (Mar. 16, 1993), the disclosures of which are hereby incorporated by reference.

The unsaturated styrenic block copolymer may be a triblock such as styrene-butadiene-styrene, styrene-isoprene-styrene, or mixtures thereof including styrene-isoprene/butadiene-styrene. Suitable diblocks such as styrene-butadiene, styrene-isoprene, or mixtures thereof, or suitable quadblocks of at least one mono alkenyl arene and at least one conjugated diene are also known. Diblock copolymers are generally unstable in high temperature environments. Therefore a mixture of diblock and multi-arm block copolymers is preferred. These block copolymers can be linear constructed by sequential polymerization of the blocks, or constructed by employing a coupling agent so that 2 or more arms of block copolymers are produced, such as (S-B)$_n$, wherein n equals 2 to 8 arms of the block copolymer S-B. Such block copolymers are commercially available from Kraton Polymers. Suitable unsaturated styrenic block copolymers include D1102, D1101, D1184, D1118, D1122, D1155, D1192, D0243, and DX220, but the invention is not limited by these.

In the present invention there are 2 potential block copolymers (S-B-S or PMS-I/B-PMS) that can be prepared via sequential polymerization techniques or by a coupling technique. Coupling block copolymers of the present invention are written as (S-B)$_n$X, or (PMS-I/B)$_n$X. In the above radial formula for the block copolymer, n is an integer of from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Pat. No. 716, 645. Suitable polyalkenyl coupling agents include divinylbenzene, and preferably m-divinylbenzene. Preferred are tetra-alkoxysilanes such as tetra-ethoxysilane (TEOS) and tetra-methoxysilane, alkyl-trialkoxysilanes such as methyltrimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Coupling efficiency is of critical importance in the synthesis of block copolymers, which copolymers are prepared by a linking technology. In a typical anionic polymer synthesis, prior to the coupling reaction, the unlinked arm has only one hard segment (typically polystyrene). Two hard segments are required in the block copolymer if it is to contribute to the strength mechanism of the material. Uncoupled arms dilute the strength forming network of a block copolymer that weakens the material. The very high coupling efficiency realized in the present invention is key to making high strength, coupled, block copolymers.

As used herein, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

Suitable styrenic block copolymers useful in the present invention have a weight average molecular weight of between 80,000 and 450,000; have a mono alkenyl arene content between 10% and 40%; a degree of branching between 2-4 with up to 80% di-block polymer; the vinyl content is at least 5 mol. %, and preferably between 5 and 65 mol. %, and most preferably between 8 and 58 mol. %; and the degree of coupling is up to 95%, preferably between 20 and 95%, and more preferably between 50 and 95%.

An energy source is useful in the crosslinking portion of the application of the present invention. The use of energy sources for crosslinking is known in the art and the invention is not intended to be limited to any particular type. Suitable energy sources include electron beam radiation, ultra violet light radiation, and/or heat.

A crosslinking promotor also termed "pro-rad" is sometimes useful in the crosslinking portion of the application of the present invention. The use of crosslinking promotors is known in the art (described in U.S. Pat. No. 6,803,014) and the invention is not intended to be limited to any particular type. Representative pro-rad additives include, but are not limited to, azo compounds, acrylate or methacrylate compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy) hexane, lauryl peroxide, tert-butyl peracetate, azobis isobutyl nitrite and the like and combination thereof. Preferred pro-rad additives for use in the present invention are compounds which have poly-functional (that is, at least two) moieties. The pro-rad is introduced to the styrenic block copolymer in any effective amount. Preferably 0.01 to 5 wt. % based on the total weight of the total concentration of block copolymer.

An initiator is sometimes useful in the crosslinking portion of the application of the present invention. The use of initiators is known in the art and the invention is not intended to be limited to any particular type. Suitable free radical initiating systems may include, for example, but not be limited to azo compounds, alkyl or acyl peroxides or hydroperoxides, ketoperoxides, peroxy esters, peroxy carbonates, and peroxy ketals, or mixtures thereof. Such compounds vary with respect to activation temperature and half-life or, in other words, the temperature at which their reaction is initiated and becomes extensive. Examples of suitable alkyl peroxides, dialkyl peroxides, hydroperoxides, acyl peroxides, peroxy esters and peroxy ketals include, but are not limited to benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl)peroxide, diisobutyl peroxide, t-butyl perbenzoate, and t-butyl peracetate, or mixtures thereof. The initiator may be employed in total amounts from about 0.001 to about 2.0 weight percent based upon the total weight of the elastomeric composition. Some peroxide initiators are set forth in Table 1, but this is not a complete list of available peroxide initiators or free radical initiators, generally.

TABLE 1

Organic Peroxide Initiators

| Trade Name | Family of Peroxide | CAS # (of peroxide component) |
|---|---|---|
| Luperox 231 | Peroxyketal | 6731-36-8 |
| Luperox 231XL40-SP | Peroxyketal | 6731-36-8 |
| Luperox 101 | Dialkyl Peroxide | 78-63-7 |
| Luperox EZD-SP2 | Dialkyl peroxide | 78-63-7 |
| Luperox DC40P-SP2 | Dicumyl peroxide | 80-43-3 |
| Vul-Cup 40KE | Dialkyl peroxide | 25155-25-3 |
| Luperox F40P-SP2 | Dialkyl peroxide | 25155-25-3 |

The polymer blends of the present invention may be compounded further with other non-polyolefin polymers, tackifying resins, endblock resins, oils, fillers, reinforcements, antioxidants, stabilizers, fire retardants, antiblocking agents, lubricants and other rubber and plastic compounding ingredients without departing from the scope of this invention. Polyolefins are typically semi-crystalline and semi-crystalline components are generally not desirable to achieve highly elastic properties due to their inherent yielding behavior.

Primary antioxidants, secondary antioxidants, and carbon radical scavengers are generally desired components in the present invention, but are not mandatory. Most antioxidants fall into the category of primary or secondary antioxidants and have different functions due to different chemical structures. A primary antioxidant is typically a hindered phenol or arylamines. Primary antioxidants scavenge alkoxy radicals and peroxy radicals. Many primary antioxidants that are compatible with styrenic block copolymers may be incorporated into the compositions of the present invention. Primary antioxidants sold under the trade name, Irganox from BASF may be suitable, such as 1010, 1076, and 1330.

Secondary antioxidants may also be used along with the Primary antioxidants. Secondary antioxidants are typically phosphites and thiosynergists. Secondary antioxidants scavenge hydroperoxides which are generated during the autoxidation cycle of a polymer exposed to heat and oxygen. Various compositions sold under the trade name, Irgafos, may be suitable and are likewise manufactured by BASF. Irgafos 168 and the like may be suitable for the present invention.

Carbon radical scavengers are considered to be a third category of antioxidant. Additionally, carbon radical scavengers for example under the tradename—Sumilizer, produced by Sumitomo Chemical may be used. Sumilizer GS is used in the Examples.

Examples of various fillers that can be employed are found in the 1971-1972 Modern Plastics Encyclopedia, pages 240-247. A reinforcement may be defined simply as the material that is added to a resinous matrix to improve the strength of the polymer. Most of these reinforcing materials are inorganic or organic products of high molecular weight. Various examples include calcium carbonate, talc, silica, clays, glass fibers, asbestos, boron fibers, carbon and graphite fibers, whiskers, quartz and silica fibers, ceramic fibers, metal fibers, natural organic fibers, and synthetic organic fibers. Especially preferred are reinforced polymer blends of the instant invention containing about 2 to about 80 percent by weight calcium carbonate, based on the total weight of the resulting reinforced blend.

EXAMPLES

Uncrosslinked Data

Comp. 1 and 2 and Ex. 1 and 2 have the formulation set forth below. Comp. 1 and 2 are comparable examples, while Ex. 1 and 2 are examples of the present invention. Ex. 1 and 2 are based on a $(PMS-I/B)_nX$ block copolymer with 20 wt. % PMS and a coupling efficiency of about 88% and a coupled triblock copolymer molecular weight of about 127 kg/mol. The difference between Comp.1 and Ex. 1 is the replacement of the polystyrene endblocks in D-1171 with polyPMS endblocks, thus forming a block copolymer of paramethylstyrene-isoprene/butadiene-paramethylstyrene. The isoprene/butadiene is a random mixture in the midblock. Likewise the difference between Comp. 2 and Ex. 2 is the replacement of the polystyrene endblocks in D-1171 with polyPMS endblocks. The properties of each of these compositions were tested for melt flow (ASTM D1238), tensile properties using a mini-D dogbone (ASTM D412), 100% hysteresis and 300% hysteresis using a 0.5" wide strip with a 3" gauge length. In the hysteresis measurement the sample is stretched to either 100% or 300% elongation and then returned to 0 load. The strain value at 0 load on the return is the "permanent set" while the area under the unloading curve is the "recoverable energy"; both permanent set and recoverable energy are measurements indicating elasticity. The results are set forth below and clearly show that Ex. 1 and 2 have superior tensile strengths than the comparative examples while maintaining similar stiffness and hysteresis properties.

| | | | | | Comp. 1 | Ex. 1 | Ex. 2 | Comp. 2 |
|---|---|---|---|---|---|---|---|---|
| (PMS-I/B)nX Polymer 1 | | | | | | 99% | 40% | |
| D1171 (S-I/B-S) | | | | | 99% | | | 40% |
| D1102 (SBS) | | | | | | | 54% | 54% |
| MC3700 (polystyrene) | | | | | | | 5% | 5% |
| Irganox 1010 (primary antioxidant) | | | | | 0.25% | 0.25% | 0.25% | 0.25% |
| Irgafos 168 (secondary antioxidant) | | | | | 0.25% | 0.25% | 0.25% | 0.25% |
| Sumilizer GS (thermal stabilizer) | | | | | 0.50% | 0.50% | 0.50% | 0.50% |
| Melt Flow | | | | | | | | |
| 190° C./5 kg | g/10 min | | | | | | 8.4 | |
| 170° C./5 kg | g/10 min | | | | | 3.3 | | 4.5 |
| Tensile Properties | | | | | | | | |
| Tensile strength | psi | MD | Avg | | 1370 | 2660 | 2540 | 1800 |
| | | | St Dev | | 120 | 160 | 390 | 140 |
| | | CD | Avg | | 1120 | 2250 | 2240 | 1750 |
| | | | St Dev | | 210 | 250 | 230 | 40 |
| Elongation | % | MD | Avg | | 1130 | 1390 | 1090 | 1090 |
| | | | St Dev | | 70 | 60 | 50 | 40 |
| | | CD | Avg | | 1260 | 1810 | 1400 | 1120 |
| | | | St Dev | | 80 | 130 | 80 | 100 |
| Modulus 100% | psi | MD | Avg | | 130 | 120 | 190 | 190 |
| | | | St Dev | | 20 | 20 | 30 | 30 |
| | | CD | Avg | | 100 | 100 | 130 | 160 |
| | | | St Dev | | 20 | 10 | 10 | 20 |
| Modulus 300% | psi | MD | Avg | | 230 | 210 | 400 | 340 |
| | | | St Dev | | 20 | 20 | 40 | 30 |
| | | CD | Avg | | 150 | 160 | 210 | 250 |
| | | | St Dev | | 20 | 10 | 20 | 20 |
| 100% hyst | | | | | | | | |
| Stress @ 100% extension | psi | MD | Avg | | 120 | 120 | 160 | 190 |
| | | | St Dev | | 5 | 10 | 10 | 10 |
| | | CD | Avg | | 80 | 100 | 120 | 170 |
| | | | St Dev | | 3 | 7 | 20 | 10 |
| Recoverable energy after 1 cycle | % | MD | Avg | | 83 | 82 | 71 | 74 |
| | | | St Dev | | 1 | 1 | 1 | 2 |
| | | CD | Avg | | 80 | 81 | 74 | 78 |
| | | | St Dev | | 1 | 1 | 3 | 0.47 |
| Hysteresis set @ 1 cycle | % | MD | Avg | | 8 | 8 | 11 | 9 |
| | | | St Dev | | 1 | 1 | 2 | 1 |
| | | CD | Avg | | 9 | 9 | 10 | 8 |
| | | | St Dev | | 1 | 1 | 2 | 0.32 |
| 300% hyst | | | | | | | | |
| Stress @ 300% extension | psi | MD | Avg | | 190 | 200 | 300 | 250 |
| | | | St Dev | | 10 | 20 | 30 | 20 |
| | | CD | Avg | | 140 | 160 | 180 | 220 |
| | | | St Dev | | 10 | 10 | 20 | 10 |
| Recoverable energy after 1 cycle | % | MD | Avg | | 80 | 80 | 72 | 73 |
| | | | St Dev | | 2 | 1 | 1 | 1 |
| | | CD | Avg | | 79 | 79 | 74 | 76 |
| | | | St Dev | | 1 | 1 | 1 | 1 |

-continued

|  |  |  |  | Comp. 1 | Ex. 1 | Ex. 2 | Comp. 2 |
|---|---|---|---|---|---|---|---|
| Hysteresis set @ 1 cycle | % | MD | Avg | 18 | 18 | 17 | 19 |
|  |  |  | St Dev | 2 | 1 | 2 | 2 |
|  |  | CD | Avg | 20 | 20 | 21 | 19 |
|  |  |  | St Dev | 2 | 1 | 3 | 1 |

In Ex. 1 and 2 above, all the SBS block copolymer, S-I/B-S block copolymer, and the PMS-I/B-PMS block copolymer have MFR >5 g/10 min. at 200° C. under 5 kg mass. The combined composition MFR in Ex. 1 was measured at 190° C. under a 5 kg mass and obtained 8.4 g/10 min. under ASTM 1238.

EXAMPLES

Crosslinked Data CD and MD

Comp. 3 is a comparative example with the same formulation as Comp 1, except the 99 wt. % D-1171 was replaced with the same as D-1171 except it contains 12 wt. % diblock instead of the 24 wt. % diblock in D-1171. Ex. 1 is the same as Comp. 3, except all the block polystyrene has been replaced with a similar block of polyparamethylstyrene. Ex. 1 also has 12 wt. % diblock as a direct comparison to Comp. 3. The properties of each of these compositions were tested for melt flow (ASTM D1238), tensile properties using a mini-D dogbone (ASTM D412), 100% and 300% hysteresis permanent set and recovered energy using a strip sample that is 0.5 inch wide with a 3 inch gauge length. The results are set forth below. The uncrosslinked (virgin) tensile strength in both the cross direction (CD) and machine direction (MD) for Ex. 1 is superior to that of Comp. 1 and Comp. 3.

In addition, Comp. 1, Comp. 2, and Ex. 1 were crosslinked by Electron Beam radiation exposed to a dosage of 186 kilograys. The results of the crosslinked samples are set forth below as "xlinked". Clearly Ex. 1 Xlinked tensile properties are superior to those for Comp. 1 Xlinked and Comp. 3 Xlinked in both the CD and MD. The relative increase in tensile strength is much higher for Ex. 1 than for Comp. 1 and 3 after crosslinking The CD tensile strength of Ex. 1 increases by about 40% after crosslinking whereas Comp. 1 and Comp. 3 CD tensile strengths increase by only about 30% and 20%, respectively. The relative increase in MD tensile strength is even more differentiated.

|  |  | Comp. 1 virgin | Comp. 1 186 kgy Xlinked | Comp. 3 virgin | Comp. 3 186 kgy Xlinked | Ex. 1 virgin | Ex. 1 186 kgy Xlinked |
|---|---|---|---|---|---|---|---|
| Tensile Properties CD |  |  |  |  |  |  |  |
| Tensile Strength | psi | 1120 | 1460 | 1340 | 1590 | 2250 | 3130 |
|  | STD | 210 | 10 | 100 | 60 | 250 | 710 |
| Elongation @ break | % | 1260 | 1330 | 1430 | 1280 | 1810 | 1350 |
|  | STD | 80 | 20 | 70 | 20 | 130 | 230 |
| 100% Modulus | psi | 100 | 100 | 110 | 120 | 100 | 80 |
|  | STD | 20 | 10 | 10 | 10 | 10 | 1 |
| 300% Modulus | psi | 150 | 230 | 190 | 250 | 160 | 260 |
|  | STD | 20 | 1 | 20 | 10 | 10 | 10 |
| 300% Hysteresis CD |  |  |  |  |  |  |  |
| Recovered Energy | % | 80 | 79 | 82 | 84 | 79 | 84 |
|  | STD | 1 | n.m. | 0.47 | n.m. | 1 | n.m. |
| Permanent Set | % | 16 | 20 | 14 | 13 | 20 | 15 |
|  | STD | 2 | n.m. | 1 | n.m. | 1 | n.m. |
| Stress @ 300% | psi | 120 | 197 | 190 | 217 | 160 | 160 |
|  | STD | 10 | n.m. | 10 | n.m. | 10 | n.m. |

|  |  | Comp. 1 | Comp. 1 186 kgy Xlinked | Comp. 3 | Comp. 3 186 kgy Xlinked | Ex. 1 | Ex. 1 186 kgy Xlinked |
|---|---|---|---|---|---|---|---|
| Tensile Properties MD |  |  |  |  |  |  |  |
| Tensile Strength | psi | 1370 | 1380 | 1550 | 1600 | 2660 | 3720 |
|  | STD | 120 | 150 | 70 | 110 | 160 | 340 |
| Elongation @ break | % | 1130 | 1290 | 1120 | 1120 | 1390 | 1670 |
|  | STD | 70 | 40 | 20 | 1 | 60 | 80 |
| 100% Modulus | psi | 130 | 110 | 150 | 160 | 120 | 150 |
|  | STD | 20 | 2 | 6 | 10 | 20 | 20 |
| 300% Modulus | psi | 230 | 240 | 260 | 330 | 210 | 270 |
|  | STD | 20 | 10 | 10 | 20 | 20 | 40 |

| 300% Hysteresis MD | | | | | | | |
|---|---|---|---|---|---|---|---|
| Recovered Energy | % | 80 | 84 | 79 | 74 | 80 | 84 |
|  | STD | 1 | n.m. | 1 | n.m. | 1 | n.m. |
| Permanent Set | % | 16 | 14 | 17 | 16 | 18 | 13 |
|  | STD | 2 | n.m. | 2 | n.m. | 1 | n.m. |
| Stress @ 300% | psi | 120 | 100 | 230 | 260 | 200 | 230 |
|  | STD | 10 | n.m. | 10 | n.m. | 20 | n.m. |

In the above crosslinked Examples containing SBS block copolymer, S-I/B-S block copolymer, and the PMS-I/B-PMS block copolymer, each have MFR >5 g/10 min. at 200° C. under 5 kg mass. The combined composition MFR in Ex. 1 was measured at 190° C. under a 5 kg mass and obtained 8.4 g/10 min. under ASTM 1238.

Thus it is apparent that there has been provided, in accordance with the invention, a universal fluid composition that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

What is claimed is:

1. An uncrosslinked elastomeric composition, suitable for elastic film or fiber, comprising:
    a block copolymer containing from about 0 wt. % to about 75 wt. % of at least two end blocks of monovinyl arene and at least one block of conjugated diene, and from about 20 wt. % to about 100 wt. % of paramethylstyrene-isoprene/butadiene-paramethylstyrene of the formula PMS-I/B-PMS linear block copolymer or $(PMS-I/B)_nX$ coupled block copolymer, where n is a number between 2 to about 30, and X is the residue of a coupling agent, and where the melt flow rates of the individual block copolymer containing at least two end blocks of monovinyl arene and at least one block of conjugated diene, and PMS-I/B-PMS polymers are about 5 g polymer per 10 minutes, or greater, when measured at 200° C. and 5 kg weight according to ASTM D1238;
    said composition optionally further including:
    0 to about 0.5 wt. % primary antioxidant;
    0 to about 0.5 wt. % secondary antioxidant; and
    0 to about 0.8 wt. % carbon radical scavenger;
    wherein the total wt. % of all components is 100% and wherein said uncrosslinked elastomeric composition has a tensile strength of at least 2200 psi.

2. The uncrosslinked elastomeric composition of claim 1, wherein said primary antioxidant is present in a range from 0.01 to 0.4 wt. %.

3. The uncrosslinked elastomeric composition of claim 1, wherein said secondary antioxidant is present in a range from 0.01 to 0.4 wt. %.

4. The uncrosslinked elastomeric composition of claim 1, wherein the recovered energy is at least 70% after 100% hysteresis measurement.

5. The uncrosslinked elastomeric composition of claim 1, wherein the permanent set is less than 10% after 100% hysteresis measurement.

6. The uncrosslinked elastomeric composition of claim 1, wherein the recovered energy is at least 70% after 300% hysteresis measurement.

7. The uncrosslinked elastomeric composition of claim 1, wherein the permanent set is less than 20% at 300% hysteresis.

8. The uncrosslinked elastomeric composition of claim 1, further including up to 25 wt. % non-polyolefin resin and/or monomer.

9. The uncrosslinked elastomeric composition of claim 1, including up to 10 wt % homo polystyrene.

10. A process for making an uncrosslinked elastomeric film or fiber, comprising: forming a composition by:
    mixing from about 0 wt % to about 75 wt % of block copolymer, having at least two end blocks of monovinyl arene and at least one block of conjugated diene, with from about 20 0 wt. % to about 75 wt. % of paramethylstyrene-isoprene/butadiene-paramethylstyrene of the formula PMS-I/B-PMS linear block copolymer or $(PMS-I/B)_nX$ coupled block copolymer, where n is a number between 2 to about 30, and X is the residue of a coupling agent, optionally adding to said mixture 0.01 to 0.4 wt. % antioxidant, 0.01 to 0.4 wt. % secondary antioxidant, and 0.2 to about 0.8 wt. % carbon radical scavenger,
    wherein the total wt. % of all composition components is 100%, and wherein the melt flow rates of the individual block copolymer containing at least two end blocks of monovinyl arene and at least one block of conjugated diene, and PMS-I/B-PMS polymers are about 5 g polymer per 10 minutes, or greater, when measured at 200° C. and 5 kg weight according to ASTM D1238;
    melting said composition; and
    extruding said composition into an uncross-linked film or fiber.

11. The process of claim 10, wherein the recovered energy is at least 70% after 100% hysteresis measurement.

12. The process of claim 10, wherein the permanent set is less than 10% after 100% hysteresis measurement.

13. The process of claim 10, wherein the recovered energy is at least 70% after 300% hysteresis measurement.

14. The process of claim 10, wherein the permanent set is less than 20% at 300% hysteresis.

15. The process of claim 10, wherein said mixing step includes mixing up to 10 wt. % homo polystyrene.

* * * * *